(12) United States Patent
Kishihara (10) Patent No.: US 10,856,592 B2
(45) Date of Patent: Dec. 8, 2020

(54) GLOVE WITH SLEEVE AND PRODUCTION METHOD OF THE SAME

(71) Applicant: SHOWA GLOVE CO., Himeji (JP)

(72) Inventor: Hidetoshi Kishihara, Hyogo (JP)

(73) Assignee: SHOWA GLOVE CO., Hyogo (JP)

( * ) Notice: Subject to any disclaimer, the term of this patent is extended or adjusted under 35 U.S.C. 154(b) by 0 days.

(21) Appl. No.: 15/375,422

(22) Filed: Dec. 12, 2016

(65) Prior Publication Data

US 2017/0172233 A1    Jun. 22, 2017

(30) Foreign Application Priority Data

Dec. 16, 2015    (JP) ................................ 2015-244967

(51) Int. Cl.
  *A41D 19/00*    (2006.01)
  *B29C 65/48*    (2006.01)
  (Continued)

(52) U.S. Cl.
  CPC ..... *A41D 19/0089* (2013.01); *A41D 19/0006* (2013.01); *A41D 19/0044* (2013.01); *B29C 65/02* (2013.01); *B29C 65/484* (2013.01); *B29C 66/1122* (2013.01); *B29C 66/5344* (2013.01); *B29C 66/71* (2013.01);
  (Continued)

(58) Field of Classification Search
  CPC .. A41D 19/00–19/046; A41D 2500/50; A47K 7/02; A47L 13/18–19; B25J 1/00–12; B29C 65/484; B29C 66/71; B29C 66/5344; B29C 66/1122;
  (Continued)

(56) References Cited

U.S. PATENT DOCUMENTS 6,539,549 B1 *   4/2003   Peters, Jr. .......... A41D 19/0075
                                                         15/227
6,566,435 B1 *   5/2003   Teoh ..................... C08L 13/02
                                                         128/844
(Continued)

FOREIGN PATENT DOCUMENTS

JP    2002-283465 A    10/2002
JP    2003-145680 A    5/2003

OTHER PUBLICATIONS

Machine translation of JP 2002-283465. (Year: 2002).*

(Continued)

*Primary Examiner* — John D Freeman
(74) *Attorney, Agent, or Firm* — Norris McLaughlin, P.A.

(57) ABSTRACT

A glove with a sleeve is provided in which the bonding strength between the glove main body and the sleeve is great, allowing easy wearing and removal as well as easy overlapping of the glove main body and the sleeve upon bonding. The glove with a sleeve includes: a glove main body compromising rubber or a resin as a principal component; and a cylindrical sleeve comprising a thermoplastic resin as a principal component that is arranged to protrude from a cuff portion of the glove main body, in which the cuff portion of the glove main body is bonded to one end portion of the sleeve through a moisture-curing urethane-based hot melt adhesive. The moisture-curing urethane-based hot melt adhesive is preferably crosslinked. A post-curing thermal deformation temperature of the moisture-curing urethane-based hot melt adhesive is preferably no less than 80° C.

3 Claims, 2 Drawing Sheets

(51) Int. Cl.
  *B29C 65/42* (2006.01)
  *B29C 65/00* (2006.01)
  *B29C 65/02* (2006.01)
  *B29L 31/48* (2006.01)

(52) U.S. Cl.
  CPC ...... *B29C 66/7392* (2013.01); *A41D 2300/52* (2013.01); *A41D 2500/50* (2013.01); *B29C 66/43* (2013.01); *B29L 2031/4864* (2013.01)

(58) Field of Classification Search
  CPC ..... B29C 66/7392; B29C 65/02; B29C 66/43; B29L 2031/4864
  See application file for complete search history.

(56) References Cited

U.S. PATENT DOCUMENTS

| | | | |
|---|---|---|---|
| 2006/0068140 A1* | 3/2006 | Flather | A61B 42/10 428/36.1 |
| 2008/0092280 A1 | 4/2008 | Johnson et al. | |
| 2009/0159205 A1 | 6/2009 | Wang | |
| 2014/0157475 A1* | 6/2014 | Smith | A41D 19/0062 2/16 |

OTHER PUBLICATIONS

Extended Search Report dated Apr. 25, 2017, issued in counterpart European Application No. 16203469.8 (8 pages).
Office Action dated Sep. 25, 2018 of corresponding European Patent Application No. 16203469.8.

* cited by examiner

GLOVE WITH SLEEVE AND PRODUCTION METHOD OF THE SAME

BACKGROUND OF THE INVENTION

Field of Invention

The present invention relates to a glove with a sleeve and a production method of a glove with a sleeve.

Description of the Related Art

Gloves with sleeves are used for example in housework such as washing tasks for preventing sleeves of user's clothes from getting wet. In industries, gloves with sleeves having heat resistance, chemical resistance, oil resistance and the like imparted thereto are used in fields of machinery, petrochemistry, fishery and agriculture.

As such a glove with a sleeve, gloves have been known in which one end portion of a cylindrical sleeve is bonded to a glove main body comprising rubber or a resin as a principal component so as to protrude from a cuff portion thereof in light of water proofing properties, oil resistance, chemical resistance and the like.

A great bonding strength is required in a bonded portion between the glove main body and the sleeve, in order to prevent water, oil, chemical and the like from entering through the bonded portion. In this regard, a glove with a sleeve has been proposed obtained by: applying a thermoplastic elastomer to a circumferential edge of a cuff portion of a rubber glove main body and then drying, thereby providing a bonding face; and thermally bonding a circumferential edge of one end portion of a sleeve comprising a thermoplastic resin as a principal component to the bonding face (Japanese Unexamined Patent Application, Publication No. 2003-145680). In this conventional glove with a sleeve, the thermoplastic elastomer can stretch along with stretching of the rubber glove main body and the sleeve, and tensile strength of the bonded portion is therefore high.

However, in this conventional glove with a sleeve, the bonding strength of the bonded portion is insufficient and therefore separation of the rubber glove main body from the sleeve is likely. In addition, the bonded portion, which deforms along with the movement of the rubber glove main body and of the sleeve due to elasticity of the thermoplastic elastomer, encumbers wearing and removal of the glove. Furthermore, the bonding face with the thermoplastic elastomer being applied has a high kinetic coefficient of friction, making it difficult to arrange the sleeve in a sliding manner on the bonding face with the thermoplastic elastomer being applied, upon thermal bonding between the rubber glove main body and the sleeve.

PRIOR ART DOCUMENTS

Patent Documents

Patent Documents 1: Japanese Unexamined Patent Application Publication No. 2003-145680

SUMMARY OF THE INVENTION

The present invention has been made in view of the aforementioned situation, and an object of the invention is to provide: a glove with a sleeve in which the bonding strength between the glove main body and the sleeve is superior, that facilitates wearing and removal of the glove and facilitates overlapping of the glove main body and the sleeve upon bonding.

According to an aspect of the invention made for solving the aforementioned problems, a glove with a sleeve comprises: a glove main body comprising rubber or a resin as a principal component; and a cylindrical sleeve comprising a thermoplastic resin as a principal component that is arranged to protrude from a cuff portion of the glove main body, in which the cuff portion of the glove main body is bonded to one end portion of the sleeve through a moisture-curing urethane-based hot melt adhesive.

In the glove with a sleeve, the moisture-curing urethane-based hot melt adhesive, which is superior in adhesive force with respect to rubber and resins, is used for bonding the glove main body to the sleeve, whereby the bonding strength between the glove main body and the sleeve becomes great. In addition, the bonded portion where the glove main body and the sleeve are bonded together through the moisture-curing urethane-based hot melt adhesive does not follow movement of the glove main body and the sleeve, and is less likely to deform. Accordingly, the glove with a sleeve is easy to wear and to remove. Furthermore, a surface of the moisture-curing urethane-based hot melt adhesive in a hardened state has a low kinetic coefficient of friction. As a result, the glove with a sleeve facilitates, during production thereof, overlapping of the glove main body and the sleeve by hardening the moisture-curing urethane-based hot melt adhesive and allowing the sleeve to slide on the surface thereof.

The moisture-curing urethane-based hot melt adhesive is preferably crosslinked. With the moisture-curing urethane-based hot melt adhesive being thus crosslinked, the bonding strength of the bonded portion in the glove with a sleeve is increased, and chemical resistance is improved to thereby enable inhibition of decrease in the bonding strength due to chemicals.

A post-curing thermal deformation temperature of the moisture-curing urethane-based hot melt adhesive thereof is preferably no less than 80° C. With the post-curing thermal deformation temperature of the moisture-curing urethane-based hot melt adhesive being no less than the above defined lower limit, the bonded portion where the glove main body and the sleeve are bonded together through the moisture-curing urethane-based hot melt adhesive is less likely to deform even in a high-temperature environment, whereby the bonding strength between the glove main body and the sleeve can be maintained even it the high-temperature environment.

The glove main body preferably comprises a carboxyl group-containing acrylonitrile-butadiene rubber. With the glove main body thus comprising a carboxyl group-containing acrylonitrile-butadiene rubber, the bonding strength between the glove main body and the sleeve is increased by virtue of a bond between a carboxyl group in the acrylonitrile-butadiene rubber and a reactive group such as an isocyanate group included in urethane in the moisture-curing urethane-based hot melt adhesive.

The principal component of the sleeve is preferably polyurethane, an ethylene-vinyl acetate copolymer, or polyvinyl chloride. Polyurethane, an ethylene-vinyl acetate copolymer, and polyvinyl chloride, which are superior in lightweight properties, flexibility, and elasticity, are suitable as a material for the sleeve. Of these, polyurethane provides favorable adhesiveness between the sleeve and the moisture-curing urethane-based hot melt adhesive, since polyurethane is the same component as urethane which is the principal component of the moisture-curing urethane-based hot melt adhesive.

According to another aspect of the invention made for solving the aforementioned problems, a production method of a glove with a sleeve, which comprises: a glove main body that comprises rubber or a resin as a principal component; and a cylindrical sleeve that comprises a thermoplastic resin as a principal component and is arranged to protrude from a cuff portion of the glove main body, comprises the steps in the order of: applying a heated moisture-curing urethane-based hot melt adhesive onto one end portion of the sleeve; hardening the moisture-curing urethane-based hot melt adhesive; arranging the cuff portion of the glove main body so as to overlap the portion of the sleeve onto which the adhesive has been applied; bonding by thermal compression the sleeve to the glove main body by heating the moisture-curing urethane-based hot melt adhesive and compressing the sleeve and the glove main body together; and curing the moisture-curing urethane-based hot melt adhesive.

In the production method of a glove with a sleeve, the glove main body and the sleeve are bonded together through the moisture-curing urethane-based hot melt adhesive. Accordingly, the production method of a glove with a sleeve enables production of a glove with a sleeve in which the bonding strength between the glove main body and the sleeve is superior, that facilitates wearing and removal of the glove and facilitates overlapping of the glove main body and the sleeve upon bonding. In addition, in the production method of a glove with a sleeve, tackiness of the moisture-curing urethane-based hot melt adhesive is decreased by hardening the moisture-curing urethane-based hot melt adhesive subsequent to application, whereby slip properties of a surface thereof are improved. Therefore, the production method of a glove with a sleeve facilitates overlapping of the glove main body and the sleeve upon bonding.

The term "principal component" as referred to means a component which is of the highest content, for example a component of which content is no less than 50% by mass. In addition, the term "thermal deformation temperature" as referred to means, given the bonding strength at 25° C. (room temperature) between the glove main body and the sleeve having been bonded being 100%, a temperature at which the bonding strength is 50%. Here, the "bonding strength between the glove main body and the sleeve" is a value obtained by: cutting out a test piece of 10 mm in width and 60 mm in length including the bonded portion between the glove main body and the sleeve; conducting a 180° peeling test by using the test piece at a pulling rate of 50 mm/min with a travel distance of 100 mm; and dividing an average value of a plurality of peaks and a plurality of valleys of a load measured in the 180° peeling test by an average width of the bonded portion. It is to be noted that the "average width of the bonded portion" is an average length of the bonded portion in a width direction of the test piece.

Effects of the Invention

As described in the foregoing, the aspects of the present invention can provide: a glove with a sleeve in which the bonding strength between the glove main body and the sleeve is superior, that facilitates wearing and removal of the glove and facilitates overlapping of the glove main body and the sleeve upon bonding; and a production method of the glove with a sleeve.

DESCRIPTION OF THE PREFERRED EMBODIMENTS

Embodiments of the present invention are described in detail hereafter with reference to the Drawings as necessary.

Glove with Sleeve

Figure 1:
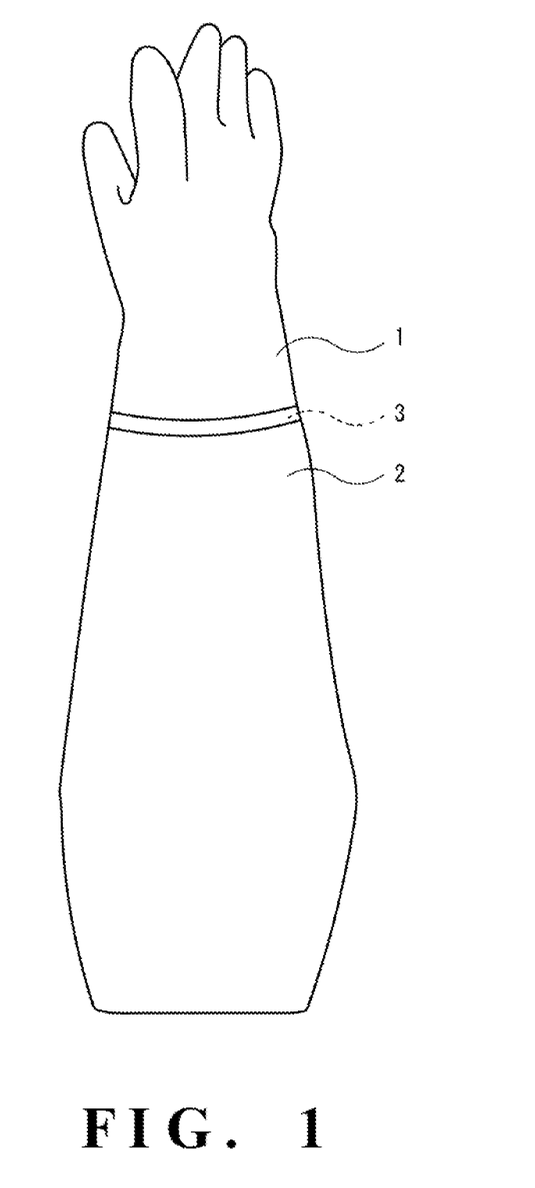
FIG. 1 is a perspective view taken from a dorsal side of a glove according to an embodiment of the present invention.
Figure 2:
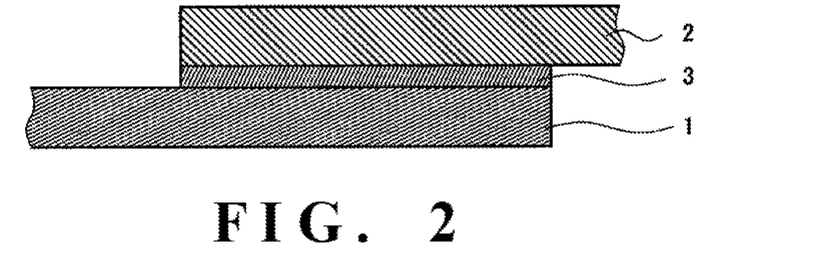
FIG. 2 is a schematic partial cross-sectional view of a bonded portion between a glove main body and a sleeve of the glove of FIG. 1.

The glove with a sleeve illustrated in FIGS. 1 and 2 comprises a glove main body 1 and a cylindrical sleeve 2 that is arranged to protrude from a cuff portion of the glove main body 1. In addition, the cuff portion of the glove main body 1 and one end portion of the sleeve 2 are arranged in an overlapping manner and are bonded together through a moisture-curing urethane-based hot melt adhesive 3.

Glove Main Body

The glove main body 1 includes: a main body portion formed in a pouch-like shape to cover a dorsal side and a palm of a user's hand; an extending portion extending from the main body portion to cover user's fingers; and a cylindrical cuff portion extending from the main body portion in an opposite direction from the extending portion to cover user's wrist. The extending portion includes a first finger portion, a second finger portion, a third finger portion, a fourth finger portion, and a fifth finger portion that cover a user's first finger (thumb), second finger (index finger), third finger (middle finger), fourth finger (ring finger), and fifth finger (pinky finger) respectively. The first to fifth finger portions are each formed in a cylindrical shape with a closed fingertip portion.

The glove main body 1 comprises rubber or a resin as a principal component. The rubber and the resin are not particularly limited and examples thereof include an acrylonitrile-butadiene rubber, a natural rubber, a chloroprene rubber, polyvinyl chloride (PVC), polyurethane, and the like.

The glove main body 1 preferably comprises a carboxyl group-containing acrylonitrile-butadiene rubber. With the glove main body 1 thus comprising a carboxyl group-containing acrylonitrile-butadiene rubber, the bonding strength between the glove main body 1 and the sleeve 2 is increased by virtue of a bond between a carboxyl group in the acrylonitrile-butadiene rubber and a reactive group such as an isocyanate group included in the urethane in the moisture-curing urethane-based hot melt adhesive 3.

The lower limit of the content of the carboxyl group-containing acrylonitrile-butadiene rubber is preferably 10% by mass, more preferably 30% by mass, and further more preferably 50% by mass. In the case of the content of the carboxyl group-containing acrylonitrile-butadiene rubber being less than the lower limit, an effect of improving the bonding strength between the glove main body 1 and the sleeve 2 may be insufficient. On the other hand, the upper limit of the content of the carboxyl group-containing acrylonitrile-butadiene rubber is not particularly limited and may be 100% by mass.

It is to be noted that the glove main body 1 may have a single layer structure or a multilayer structure composed of different rubber or resin layers. In the case of the glove main body 1 having the multilayer structure, it is preferred that the carboxyl group-containing acrylonitrile-butadiene rubber is contained in a layer on an external surface side.

Furthermore, in addition to substances that are generally blended thereinto such as a crosslinking agent, a pigment, a surfactant, a vulcanization accelerator, an antioxidant, a thickening agent, a plasticizer, and the like, the glove main body 1 may also contain an anti-tackifier, a filler, an antimicrobial agent, and the like.

The glove main body 1 may be subjected to a degreasing treatment. The degreasing treatment of the glove main body 1 reduces variance in bonding strength between the glove main body 1 and the sleeve 2 from product to product.

The lower limit of an average thickness of the glove main body 1 is preferably 0.1 mm, and more preferably 0.15 mm. On the other hand, the upper limit of the average thickness of the glove main body 1 is preferably 4 mm, and more preferably 3 mm. In the case of the average thickness of the glove main body 1 being less than the lower limit, durability of the glove with a sleeve may be decreased. To the contrary, in the case of the average thickness of the glove main body 1 being greater than the upper limit, workability during use may be deteriorated. The term "average thickness of the glove main body 1" as referred to means an average value of thicknesses measured at nine equally divided cells (3 rows×3 columns) drawn in an area of 45 mm×45 mm in the cuff portion of the glove, by using a constant pressure thickness gauge (for example "PG-15" available from Tecklock Corp., gauge head diameter: 10 mm, compression load (measuring force): 240 gf).

Sleeve

The sleeve 2 is formed in a cylindrical shape so as to cover user's arm and arranged to protrude from the cuff portion of the glove main body 1. In addition, one end portion of the sleeve 2 is arranged to overlap, and bonded through the moisture-curing urethane-based hot melt adhesive 3 to an external side of the cylindrical cuff portion of the glove main body 1. The sleeve 2 can prevent water, chemical and the like from getting into contact with user's arm, clothes, and the like.

The sleeve 2 comprises a thermoplastic resin as a principal component. The thermoplastic resin is not particularly limited and examples thereof include polyurethane, polyethylene, polypropylene, an ethylene-vinyl acetate copolymer, an ethylene-methyl methacrylate copolymer, polyvinyl chloride, and the like. Of these, polyurethane, an ethylene-vinyl acetate copolymer, or polyvinyl chloride is preferred as the principal component of the sleeve 2. Polyurethane, an ethylene-vinyl acetate copolymer, and polyvinyl chloride, which are superior in lightweight properties, flexibility, and elasticity, are suitable as a material for the sleeve. Of these, polyurethane provides favorable adhesiveness between the sleeve 2 and the moisture-curing urethane-based hot melt adhesive 3, since polyurethane is the same component as urethane which is the principal component of the moisture-curing urethane-based hot melt adhesive 3. In addition, the bonding strength of an ethylene-vinyl acetate copolymer with respect to the glove main body 1 can be increased by subjecting to surface modification such as a corona treatment. It is to be noted that the sleeve 2 may have a single layer structure or a multilayer structure composed of different thermoplastic resin layers. In the case of the sleeve 2 having the multilayer structure, a bilayer structure is preferred of which an external surface side comprises an ethylene-vinyl acetate copolymer and an internal surface side comprises polyurethane.

Furthermore, in addition to substances that are generally blended thereinto such as a crosslinking agent, a pigment, a surfactant, a vulcanization accelerator, an antioxidant, a thickening agent, a plasticizer, and the like, the sleeve 2 may also contain an anti-tackifier, a filler, an antimicrobial agent, and the like.

The lower limit of an average thickness of the sleeve 2 is preferably 0.08 mm, and more preferably 0.1 mm. On the other hand, the upper limit of the average thickness of the sleeve 2 is preferably 0.5 mm, and more preferably 0.4 mm. In the case of the average thickness of the glove main body 2 being less than the lower limit, durability of the glove with a sleeve may be decreased. To the contrary, in the case of the average thickness of the sleeve 2 being greater than the upper limit, workability during use may be deteriorated. The term "average thickness of the sleeve 2" as referred to means a value measured by a similar procedure to that for the glove main body 1.

An end portion of the sleeve 2 on a side to the glove main body 1 is preferably aligned substantially with an end portion of an area with the moisture-curing urethane-based hot melt adhesive 3 being applied (described later) on a side to a fingertip of the glove main body 1. By thus arranging the end portion of the sleeve 2 so as to be aligned substantially with the end portion of the area with the moisture-curing urethane-based hot melt adhesive 3 being applied on a side to the fingertip of the glove main body 1, a boundary can smoothly connect the glove main body 1 with the sleeve 2 on the external surface side of the glove with a sleeve. By virtue of the above, deterioration of the workability during use of the glove with a sleeve due to unevenness in the vicinity of the boundary between the glove main body 1 and the sleeve 2 can be inhibited. Alternatively the end portion of the sleeve 2 on the side to the glove main body 1 may be positioned closer to an end portion of the area with the moisture-curing urethane-based hot melt adhesive 3 being applied on a side to the cuff portion of the glove main body 1 than to the end portion thereof on the side to the fingertip of the glove main body 1. In other words, there may be an area where the moisture-curing urethane-based hot melt adhesive 3 is not covered by the sleeve 2. The upper limit of an average width of the area where the moisture-curing urethane-based hot melt adhesive 3 is not covered by the sleeve 2 is preferably 0.3 cm. In the case of the average width of the area in which the moisture-curing urethane-based hot melt adhesive 3 is not covered by the sleeve 2 being greater than the upper limit, the workability during use of the glove with a sleeve may be deteriorated.

Moisture-Curing Urethane-Based Hot Melt Adhesive

The moisture-curing urethane-based hot melt adhesive 3 bonds the cuff portion of the glove main body 1 to the one end portion of the sleeve 2.

The moisture-curing urethane-based hot melt adhesive 3 is a solvent-free one-component adhesive comprising a urethane prepolymer, which has an isocyanate group at a terminal, as a principal component.

Examples of polyol used in the urethane prepolymer include polyester polyol, polyether polyol, polyalkylene polyol, polycarbonate polyol, and the like. In addition, examples of the isocyanate group include: aromatic diisocyanate compounds such as diphenylmethane diisocyanate and tolylene diisocyanate; aliphatic diisocyanate compounds such as hexamethylene diisocyanate; and the like.

The moisture-curing urethane-based hot melt adhesive 3 may contain a curing catalyst e.g.: a tin compound such as dibutyltin dilaurate; an organic metal catalyst such as a titanium compound; a tertiary amine compound such as triethylamine and triethylene diamine; and the like. In addition, the moisture-curing urethane-based hot melt adhesive 3 may also contain additives such as a plasticizer, a tackifier, various types of fillers, a pigment, a wax, a moisture removing agent, a storage stabilizer, an antioxidant, and a carbon dioxide scavenger, and the like as needed.

The moisture-curing urethane-based hot melt adhesive 3 prior to curing is semi-crosslinked, and has characteristics of liquefying under heat and hardening upon cooling. By liquefying and then hardening the moisture-curing urethane-based hot melt adhesive 3, a kinetic coefficient of friction of a surface of the moisture-curing urethane-based hot melt adhesive 3 alone is lowered and the surface becomes smooth.

In addition, the moisture-curing urethane-based hot melt adhesive 3 can be used to bond objects together as follows: heat-melting the moisture-curing urethane-based hot melt adhesive 3; applying the moisture-curing urethane-based hot melt adhesive 3 thus melted to one object to be bonded; placing the other object to be bonded thereonto; and then bonding the objects to be bonded by thermal compression. The moisture-curing urethane-based hot melt adhesive 3 bonds the cuff portion of the glove main body 1 to the one end portion of the sleeve 2 by virtue of this adhesiveness.

The moisture-curing urethane-based hot melt adhesive 3 is preferably crosslinked after the thermocompression bonding. Urethane, which is the principal component of the moisture-curing urethane-based hot melt adhesive 3, has an isocyanate group at a molecular terminal. The terminal isocyanate group reacts with moisture and the like in the air, to thereby generate an unstable carbamic acid group. The carbamic acid group further degrades into amines and carbon dioxide. An amino group thus generated reacts rapidly with other isocyanate group to form a urea bond and a cross-linked structure, whereby urethane in the moisture-curing urethane-based hot melt adhesive 3 is polymerized. By thus crosslinking the moisture-curing urethane-based hot melt adhesive 3 by virtue of the above-described characteristics, the bonding strength of the bonded portion of the glove with a sleeve is increased, and chemical resistance is improved to thereby enable inhibition of decrease in bonding strength due to chemicals.

The moisture-curing urethane-based hot melt adhesive 3 is provided in a strip-like shape in an area where the cuff portion of the glove main body 1 and the one end portion of the sleeve 2 are arranged in an overlapping manner. The moisture-curing urethane-based hot melt adhesive 3 may be provided either continuously or intermittently so as to surround the cuff portion of the glove main body 1; however, it is preferred that the moisture-curing urethane-based hot melt adhesive 3 is continuously provided, in light of prevention of water and the like from entering from the cuff portion of the glove main body 1. In addition, an end portion of the area with the moisture-curing urethane-based hot melt adhesive 3 being applied on a side to the sleeve 2 is preferably aligned substantially with an end portion of the cuff portion of the glove main body 1 on a side to the sleeve 2. Alternatively, the end portion of the area with the moisture-curing urethane-based hot melt adhesive 3 being applied on a side to the sleeve 2 may be positioned toward the fingertip side of the glove main body 1 from a cuff-side end portion of the glove main body 1. In other words, the cuff-side end portion of the glove main body 1 may have an area not covered with the moisture-curing urethane-based hot melt adhesive 3. The upper limit of an average width of the area in the cuff-side end portion of the glove main body 1 not covered with the moisture-curing urethane-based hot melt adhesive 3 is preferably 0.5 cm. In the case of the average width of the area in the cuff-side end portion of the glove main body 1 not covered with the moisture-curing urethane-based hot melt adhesive 3 being greater than the upper limit, a non-bonded part in the cuff portion of the glove main body 1 may encumber wearing and removal of the glove with a sleeve.

The lower limit of an average width of the area with the moisture-curing urethane-based hot melt adhesive 3 being applied is preferably 0.3 cm, and more preferably 0.5 cm. The upper limit of the average width of the area with the moisture-curing urethane-based hot melt adhesive 3 being applied is preferably 2.5 cm, and more preferably 2 cm. In the case of the average width of the area with the moisture-curing urethane-based hot melt adhesive 3 being applied being less than the lower limit, the bonding strength between the glove main body 1 and the sleeve 2 may be insufficient, and an effect of preventing water and the like from entering from the cuff portion of the glove main body 1 may be insufficient. To the contrary, in the case of the average width of the area with the moisture-curing urethane-based hot melt adhesive 3 being applied being greater than the upper limit, the workability during use may be deteriorated by a wide overlapping area between the glove main body 1 and the sleeve 2. It is to be noted that the "average width of the moisture-curing urethane-based hot melt adhesive" as referred to means an average length, in an axial direction of the sleeve 2, of the area with the moisture-curing urethane-based hot melt adhesive 3 being applied.

The lower limit of an average thickness of the area with the moisture-curing urethane-based hot melt adhesive 3 being applied (a distance between a bonding face of the glove main body 1 and a bonding face of the sleeve 2) is preferably 10 µm and more preferably 20 µm. On the other hand, the upper limit of the average thickness of the area with the moisture-curing urethane-based hot melt adhesive 3 being applied is preferably 900 µm and more preferably 500 µm. In the case of the average thickness of the area with the moisture-curing urethane-based hot melt adhesive 3 being applied being less than the lower limit, the bonding strength between the glove main body 1 and the sleeve 2 may be insufficient. To the contrary, in the case of the average thickness of the area with the moisture-curing urethane-based hot melt adhesive 3 being applied being greater than the upper limit, workability during use may deteriorate. The "average thickness of the area with the moisture-curing urethane-based hot melt adhesive 3 being applied" as referred to means an average value of cross-sectional thicknesses measured at 10 arbitrary positions in an area where the glove main body 1, the sleeve 2, and the moisture-curing urethane-based hot melt adhesive 3 overlap each other, by using a digital microscope (e.g., VHX-900 available from Keyence Corporation).

The lower limit of the post-curing thermal deformation temperature of the moisture-curing urethane-based hot melt adhesive 3 is preferably 80° C., more preferably 100° C., and further more preferably 150° C. In the case of the post-curing thermal deformation temperature of the moisture-curing urethane-based hot melt adhesive 3 being less than the lower limit, the bonded portion between the glove main body 1 and the sleeve 2 bonded together by the moisture-curing urethane-based hot melt adhesive 3 is more likely to deform particularly in a high-temperature environment, whereby the bonding strength between the glove main body 1 and the sleeve 2 may decrease. On the other hand, the upper limit of the post-curing thermal deformation temperature of the moisture-curing urethane-based hot melt adhesive 3 is not particularly limited and is generally 300° C.

The lower limit of the bonding strength between the glove main body 1 and the sleeve 2 at 25° C. is preferably 10 N/cm, more preferably 15 N/cm, and further more preferably 20 N/cm. In the case of the bonding strength between the glove main body 1 and the sleeve 2 at 25° C. being less than the lower limit, the glove main body 1 and the sleeve 2 may separate during actual use. On the other hand, the upper limit of the bonding strength between the glove main body 1 and the sleeve 2 at 25° C. is not particularly limited and is generally 70 N/cm.

The lower limit of the bonding strength between the glove main body 1 and the sleeve 2 after immersion of the glove with a sleeve in normal heptane (hereinafter, may be also referred to as "n-heptane") for 30 min is preferably 10 N/cm, more preferably 15 N/cm, and further more preferably 20 N/cm. In the case of the bonding strength between the glove main body 1 and the sleeve 2 after the immersion in n-heptane being less than the lower limit, the chemical resistance of the glove with a sleeve may be insufficient. On the other hand, the upper limit of the bonding strength between the glove main body 1 and the sleeve 2 after the immersion in n-heptane is not particularly limited and is generally 70 N/cm.

The lower limit of a ratio of the bonding strength between the glove main body 1 and the sleeve 2 after the immersion of the glove with a sleeve in n-heptane for 30 min to the bonding strength prior to the immersion in n-heptane (i.e., residual ratio) is preferably 65% and more preferably 70%. In the case of the ratio of the bonding strength being less than the lower limit, the chemical resistance of the glove with a sleeve may become insufficient with time due to deterioration of average bonding strength resulting from chemicals. On the other hand, the upper limit of the ratio of the bonding strength is not particularly limited.

Manufacturing Method of Glove with Sleeve

The manufacturing method of the glove with a sleeve comprises: applying the heated moisture-curing urethane-based hot melt adhesive 3 onto one end portion of the sleeve 2; subsequent to the applying, hardening the moisture-curing urethane-based hot melt adhesive 3; subsequent to the hardening, arranging the cuff portion of the glove main body 1 so as to overlap the portion of the sleeve 2 with the adhesive being applied; subsequent to the arranging, bonding by thermal compression the sleeve 2 to the glove main body 1 by heating the moisture-curing urethane-based hot melt adhesive 3 and compressing the sleeve 2 and the glove main body 1 together; and subsequent to the bonding by thermal compression, curing the moisture-curing urethane-based hot melt adhesive 3.

Application Step

In the application step, the moisture-curing urethane-based hot melt adhesive 3 being heated is applied onto one end portion of the sleeve 2. Specifically, the sleeve 2 is fitted inside out onto a mold for a bonding process, and then the moisture-curing urethane-based hot melt adhesive 3 prior to curing is applied onto an external circumferential edge of the one end portion of the sleeve 2.

The moisture-curing urethane-based hot melt adhesive 3 prior to curing is generally solid at a room temperature (25° C.). In addition, the moisture-curing urethane-based hot melt adhesive 3 prior to curing softens under heat and hardens upon cooling. For this reason, the moisture-curing urethane-based hot melt adhesive 3 prior to curing is heated before application.

A temperature for the heating may be appropriately defined according to a type of the moisture-curing urethane-based hot melt adhesive 3 used; however, the lower limit of the heating temperature is preferably 100° C. and more preferably 110° C. On the other hand, the upper limit of the heating temperature is preferably 160° C., and more preferably 150° C. In the case of the heating temperature being less than the lower limit, softening of the moisture-curing urethane-based hot melt adhesive 3 may be insufficient, leading to difficulty in the application. To the contrary, in the case of the heating temperature being greater than the upper limit, a duration for hardening of the moisture-curing urethane-based hot melt adhesive 3 may be unnecessarily long and the glove main body 1 or the sleeve 2 may deform under heat, depending on the material of the glove main body 1 or of the sleeve 2.

The lower limit of viscosity at 140° C. of the moisture-curing urethane-based hot melt adhesive 3 prior to curing is preferably 3000 mPa·s and tore preferably 5000 mPa·s. On the other hand, the upper limit of the viscosity of the moisture-curing urethane-based hot melt adhesive 3 at 140° C. is preferably 8,000 mPa·s and more preferably 7,000 mPa·s. In the case of the viscosity of the moisture-curing urethane-based hot melt adhesive 3 at 140° C. being less than the lower limit, a flow of the moisture-curing urethane-based hot melt adhesive 3 subsequent to the application may result in uneven application. To the contrary, in the case of the viscosity of the moisture-curing urethane-based hot melt adhesive 3 at 140° C. being greater than the upper limit, the application may become difficult. The "the viscosity of the moisture-curing urethane-based hot melt adhesive 3 at 140° C." as referred to means a value measured by using a rotational viscometer (e.g., rotational viscometer "Model HBTD" manufactured by Brookfield Engineering Laboratories Inc.) at a rotation frequency of 10 rpm.

Hardening Step

In the hardening step, the moisture-curing urethane-based hot melt adhesive 3 is hardened by lowering the temperature of the moisture-curing urethane-based hot melt adhesive 3. By thus hardening the moisture-curing urethane-based hot melt adhesive 3, tackiness of the moisture-curing urethane-based hot melt adhesive 3 decreases, whereby slip properties of the surface thereof are improved. Therefore, the production method of the glove with a sleeve facilitates overlapping upon bonding of the glove main body 1 and the sleeve 2 described in the next step.

A procedure for hardening the moisture-curing urethane-based hot melt adhesive 3 is not particularly limited, and examples thereof include natural cooling by letting stand and forced cooling by cold air etc. A duration for the cooling is not particularly limited and may be, for example, no less than 30 sec and no longer than 10 min in the case of natural cooling. In the case of the cooling duration being less than the lower limit, decrease in tackiness of the moisture-curing urethane-based hot melt adhesive 3 may be insufficient. To the contrary, in the case of the cooling duration being longer than the upper limit, production efficiency of the glove with a sleeve may be deteriorated.

It is to be noted that an environmental temperature for cooling the moisture-curing urethane-based hot melt adhesive 3 is not particularly limited and may be, for example, no less than 20° C. and no greater than 50° C.

The lower limit of the kinetic coefficient of friction of the moisture-curing urethane-based hot melt adhesive 3 is preferably 0.1, and more preferably 0.2. On the other hand, the upper limit of the kinetic coefficient of friction is preferably 1.1, and more preferably 1.0. In the case of the kinetic coefficient of friction being less than the lower limit, slipperiness may lead to positional deviation between the glove main body 1 and the sleeve 2 after the overlapping thereof. To the contrary, in the case of the kinetic coefficient of friction being greater than the upper limit, the overlapping of the glove main body 1 with the sleeve 2 may be difficult. The "kinetic coefficient of friction" as referred to herein means a value measured in accordance with ASTM D1894 on a test piece with the moisture-curing urethane-based hot melt adhesive being applied and hardened.

Overlapping Step

In the overlapping step, the bonded portion of the glove main body 1, i.e., the cuff portion of the glove main body 1, is arranged so as to overlap a portion of the sleeve 2 with the adhesive being applied. Specifically, the glove main body 1 is turned inside out such that an internal face is directed outward; the cuff portion of the glove main body 1 is placed so as to cover an end portion of the sleeve 2; the cuff portion is moved in a sliding manner so as to overlap the portion with the adhesive.

Thermocompressive Bonding Step

In the thermocompressive bonding step, the sleeve 2 and the glove main body 1 are thermocompressively bonded together by heating the moisture-curing urethane-based hot melt adhesive 3 and compressing the sleeve 2 and the glove main body 1.

A temperature for the heating may be appropriately defined according to a type of the moisture-curing urethane-based hot melt adhesive 3 used, a material of the glove main body 1, and a material of the sleeve 2; however, the lower limit of the heating temperature is preferably 80° C. and more preferably 100° C. On the other hand, the upper limit of the heating temperature is preferably 150° C., and more preferably 140° C. In the case of the heating temperature being less than the lower limit, softening of the moisture-curing urethane-based hot melt adhesive 3 may be insufficient leading to an insufficient bonding strength. To the contrary, in the case of the heating temperature being greater than the upper limit, the glove main body 1 or the sleeve 2 may deform under heat depending on the material of the glove main body 1 or of the sleeve 2.

It is to be noted that the heating temperature in the thermocompressive bonding step is preferably lower than the heating temperature in the application step, and a temperature difference therebetween is preferably no less than 5° C. and no greater than 30° C. By thus defining the heating temperature in the thermocompressive bonding step to be lower than the heating temperature in the application step, the moisture-curing urethane-based hot melt adhesive 3 can adhere to the glove main body 1 while maintaining adhesion of the moisture-curing urethane-based hot melt adhesive 3 to the sleeve 2.

The lower limit of a compression force in the compression is preferably 0.025 kg/cm$^2$, and more preferably 0.05 kg/cm$^2$. On the other hand, the upper limit of the compression force is preferably 3.0 kg/cm$^2$, and more preferably 2.0 kg/cm$^2$. In the case of the compression force being less than the lower limit, the bonding strength may be insufficient. To the contrary, in the case of the compression force being greater than the upper limit, the glove with a sleeve may deform.

A duration for the compression is preferably no less than 3 sec. By thus defining the compression duration to be no less than 3 sec, the glove main body 1 and the sleeve 2 can be compressively bonded more certainly.

Curing Step

Subsequent to the thermocompressive bonding step, the moisture-curing urethane-based hot melt adhesive 3 is cured.

A curing procedure for the moisture-curing urethane-based hot melt adhesive 3 is not particularly limited and examples thereof include: a procedure of letting stand in the air; a procedure of impregnating the sleeve 2 and the like with moisture; and the like. Of these, the procedure of letting stand in the air is preferred in light of convenience of production. The atmosphere for the curing by letting stand the moisture-curing urethane-based hot melt adhesive 3 is preferably air with moisture. By thus letting stand in the air with moisture, the moisture-curing urethane-based hot melt adhesive 3 undergoes a crosslinking reaction by virtue of the moisture, whereby the bonding strength increases.

The lower limit of a duration of the curing is preferably 15 hrs, and more preferably 20 hrs. In the case of the curing duration being less than the lower limit, the effect of increasing the bonding strength may be insufficient. On the other hand, the upper limit of the curing duration is not particularly limited; however, 1 week is preferred in light of production efficiency.

In the case of curing the moisture-curing urethane-based hot melt adhesive 3 by letting stand, the lower limit of moisture in the air during the curing is preferably 15% and more preferably 30%. On the other hand, the upper limit of the moisture in the air during the curing is preferably 70% and more preferably 60%. In the case of the moisture being less than the lower limit, crosslinking of the moisture-curing urethane-based hot melt adhesive 3 does not sufficiently proceed, whereby the effect of increasing the bonding strength may be insufficient. To the contrary, in the case of the moisture being greater than the upper limit, dew condensation and the like may necessitate a drying treatment of the glove with a sleeve, resulting in increase in the production cost.

It is to be noted that a temperature for curing the moisture-curing urethane-based hot melt adhesive 3 is not particularly limited as long as the temperature allows the crosslinking reaction to proceed, and may be, for example, no less than 25° C. and no greater than 60° C.

Advantages

In the glove with a sleeve, the moisture-curing urethane-based hot melt adhesive, which is superior in adhesive force with respect to rubber and a resin, is used for bonding the glove main body 1 to the sleeve 2, whereby the bonding strength between the glove main body 1 and the sleeve 2 becomes great. In addition, since the bonded portion between the glove main body 1 and the sleeve 2 bonded through the moisture-curing urethane-based hot melt adhesive 3 is less likely to deform, the glove with a sleeve facilitates wearing and removal thereof. Furthermore, the surface of the moisture-curing urethane-based hot melt adhesive 3 in the hardened state has a low kinetic coefficient of friction. As a result, the glove with a sleeve facilitates, during production thereof, overlapping of the glove main body 1 and the sleeve 2 by first hardening the moisture-curing urethane-based hot melt adhesive 3 and then allowing the sleeve 2 to slide on the surface of the moisture-curing urethane-based hot melt adhesive 3.

Other Embodiments

The present invention is not limited to the above-described embodiments, and can also be carried out in modes modified and improved in various ways.

For example, the glove main body constituting the glove with a sleeve may have other layer on an exterior face or an interior face thereof, except in the area where the moisture-curing urethane-based hot melt adhesive is provided. Examples of such other layer include a coating layer. The coating layer to be overlaid may be either a single layer or in a multilayer structure with two or more layers. The sleeve may also have other layer on an exterior face or an interior face thereof, except in the area where the moisture-curing urethane-based hot melt adhesive is provided.

Although in the above-described embodiment the production method of a glove with a sleeve has been described in which the moisture-curing urethane-based hot melt adhesive is applied onto one end portion of the sleeve, the moisture-curing urethane-based hot melt adhesive is hardened, and then the glove main body is arranged so as to overlap the adhesive thus hardened; however, alternatively, a method may also be employed in which the moisture-curing urethane-based hot melt adhesive is applied onto the cuff portion of the glove main body, the moisture-curing urethane-based hot melt adhesive is hardened, and then the sleeve is arranged so as to overlap the adhesive thus hardened. In this case, the application step comprises: fitting the glove main body correct side out onto the mold for a bonding process; and applying the moisture-curing urethane-based hot melt adhesive onto an external circumferential edge of the cuff portion of the glove main body.

EXAMPLES

The present invention is described further in detail hereafter by way of Example and Comparative Example; however, the present invention is not limited to the following Example.

Example 1

A glove main body comprising a carboxyl group-containing acrylonitrile-butadiene rubber as a principal component and a sleeve comprising urethane as a principal component were prepared. The sleeve was fitted inside out onto a mold for a bonding process, and a moisture-curing urethane-based hot melt adhesive ("PUR 703.5" available from Kleiberit Adhesives of Japan Co., Ltd.) having been heated to 140° C. to liquefy was applied onto one end portion of the sleeve such that an average thickness after compression would be 300 μm.

The moisture-curing urethane-based hot melt adhesive was cooled for 1 min to harden, followed by arranging a cuff portion of the glove main body and a portion of the sleeve with the adhesive being applied so as to overlap each other by 1 cm in width. The glove main body and the sleeve thus arranged were thermocompressively bonded at a temperature of 130° C. and a pressure of 0.16 kg/cm$^2$ and then cooled, followed by removing from the mold for a bonding process and letting stand at a temperature of 25° C. and a humidity of 45%. A glove with a sleeve of Example 1 was thus obtained.

Comparative Example 1

A glove main body comprising a carboxyl group-containing acrylonitrile-butadiene rubber as a principal component and a sleeve comprising urethane as a principal component were prepared. A urethane-based thermoplastic elastomer ("Bond G350" available from Konishi Co., Ltd.) was applied onto a cuff portion of the glove main body. It is to be noted that the urethane-based thermoplastic elastomer softens and deforms at no less than 60° C.

The urethane-based thermoplastic elastomer was dried for 15 min, followed by arranging an end portion of the sleeve and a portion of the glove main body with the elastomer being applied so as to overlap each other by 1 cm in width. The glove main body and the sleeve thus arranged were thermocompressively bonded at a temperature of 130° C. and a pressure of 0.16 kg/cm$^2$ to obtain a glove with a sleeve of Comparative Example 1.

Evaluations

The following measurement was conducted for Example 1 and Comparative Example 1.

Bonding Strength

A value of bonding strength was obtained by: cutting out a test piece of 10 mm in width and 60 mm in length including the bonded portion between the glove main body and the sleeve; conducting a 180° peeling test by using the test piece at a pulling rate of 50 mm/min with a travel distance of 100 mm; and dividing an average value of a plurality of peaks and a plurality of valleys of a load measured in the 180° peeling test by an average width of the bonded portion. The results are shown in Table 1.

Kinetic Coefficient of Friction

A kinetic coefficient of friction was measured: for Example 1, in a state of being hardened after the moisture-curing urethane-based hot melt adhesive had been applied; and for Comparative Example 1, in a state of being dried after the urethane-based thermoplastic elastomer had been applied onto the glove main body. Specifically, the measurement was conducted on bonding faces of test pieces of 63.5 mm×83.5 mm cut out from the portions of Example 1 and Comparative Example 1 with the adhesive or the elastomer having been applied. The measurement conducted in accordance with ASTM D1894 was as follows: one of the test pieces was attached to a movable weight (weight: 200 g, friction face: 63.5 mm×63.5 mm) of a frictional coefficient measurement apparatus; the movable weight was allowed to run a travel distance of 130 mm at a rate of 150 mm/min on an ethylene-vinyl acetate film; and the friction force in this operation was measured. The kinetic coefficient of friction was calculated by dividing an average friction force after attaining regular running by the normal force of the movable weight. The results are shown in Table 1.

Thermal Deformation Temperature

Given the bonding strength at 25° C. (room temperature) between the glove main body and the sleeve having been bonded being 100%, a temperature at which the bonding strength was 50% was obtained as the thermal deformation temperature. The results are shown in Table 1.

Thermal Plasticity

Thermal plasticity of the bonded portion was assessed according to the following criteria. The results are shown in Table 1.
A: No softening and no thermal plasticity observed
B: Softening and thermal plasticity observed
It is to be noted that thermal plasticity being observed can be considered to lead to facilitated softening of the bonded portion particularly in a high temperature environment.

Chemical Resistance

The gloves with sleeves of Example 1 and Comparative Example 1 were immersed in chemicals shown in Table 2 under predetermined conditions, and then the above-described measurement of the bonding strength was conducted. The results are shown in Table 2.

TABLE 1

|  |  | Example 1 | Comparative Example 1 |
|---|---|---|---|
| Bonding Strength | N/cm | 37.6 | 7.3 |
| Kinetic Coefficient of Friction | — | 0.74 | 1.28 |
| Thermal Deformation Temperature | ° C. | Over 210 | 60 |
| Thermal Plasticity | — | A | B |

The thermal deformation temperature "Over 210" in Table 1 indicates that thermal deformation was not caused even at 210° C.

TABLE 2

|  |  |  | Example 1 | | Comparative Example 1 | |
|---|---|---|---|---|---|---|
| Immersion Conditions | | | Bonding | Residual | Bonding | Residual |
| Chemicals | Temperature (° C.) | Duration | Strength (N/cm) | Ratio (%) | Strength (N/cm) | Ratio (%) |
| No Immersion | — | — | 37.6 | — | 7.3 | — |
| n-heptane | 25 | 30 min | 26.8 | 71 | 4.5 | 61 |
| 40% NaOH | 25 | 30 min | 24.6 | 65 | 4.1 | 59 |
| 96% sulfuric acid | 25 | 30 min | 41.3 | 109 | 6.2 | 84 |
| 5% NaCl | 40 | 24 hrs | 27.4 | 72 | 2.1 | 29 |

"Residual ratio" in Table 2 indicates a ratio of the bonding strength after the immersion to the bonding strength under conditions without the immersion.

Example 1 is superior in the bonding strength to Comparative Example 1. In addition, in Example 1, the thermal deformation temperature is higher than that of Comparative Example 1 and the bonded portion is not thermoplastic. The bonded portion of Example 1 is less likely to deform even in a high temperature environment. Furthermore, the bonded portion of Example 1 has a smaller kinetic coefficient of friction than Comparative Example 1 and can therefore facilitate slipping. The foregoing reveals that the glove with a sleeve of Example 1 has superior bonding strength between the glove main body and the sleeve; facilitates wearing and removal thereof; and facilitates overlapping of the glove main body with the sleeve.

Moreover, Example 1 is superior in the bonding strength to Comparative Example 1 even after the immersion in chemicals, and shows less reduction in the bonding strength due to the immersion in chemicals. According to the glove with a sleeve of Example 1, the chemical resistance is considered to have improved as a result of crosslinking having proceeded in the moisture-curing urethane-based hot melt adhesive by letting stand under predetermined conditions.

INDUSTRIAL APPLICABILITY

As explained in the foregoing, the glove with a sleeve according to the present invention is superior in the bonding strength between the glove main body and the sleeve, facilitates wearing and removal thereof, and facilitates overlapping of the glove main body and the sleeve upon bonding. Therefore, the glove with a sleeve according to the present invention can be suitably used as a glove used in housework such as washing tasks, as well as in fields of machinery, petrochemistry, fishery, and agriculture.

EXPLANATION OF REFERENCE NUMERALS

1 Glove main body
2 Sleeve
3 Moisture-curing urethane-based hot melt adhesive

What is claimed is:
1. A glove with a sleeve comprising:
a glove main body that comprises rubber or resin as a principal component; and
a cylindrical sleeve that comprises a thermoplastic resin as a principal component,
wherein
the sleeve is bonded to a cuff portion of the glove main body through an adhesive, with one end portion of the sleeve being disposed on an external side of the cuff portion of the glove main body;
an edge of an end portion on a fingertip side of the adhesive is aligned to be flush with an edge of the one end portion of the sleeve;
an edge of an end portion on a cuff portion-side of the adhesive is aligned to be flush with an edge of an end portion of the cuff portion of the glove main body; the adhesive resists deformation during donning and removing of the glove by a wearer;
an other end portion of the sleeve is arranged to protrude from the end portion on the cuff portion-side of the adhesive;
the adhesive is a moisture-curing urethane-based hot melt adhesive;

the glove main body comprises a carboxyl group-containing acrylonitrile-butadiene rubber, a content of the carboxyl group-containing acrylonitrile-butadiene rubber being no less than 10% by mass;

there is a bond between the carboxyl group in the carboxyl group-containing acrylonitrile-butadiene rubber and a reactive group in a urethane in the moisture-curing urethane-based hot melt adhesive; and a bonding strength between the glove main body and the sleeve at 25° C. is at least 10 N/cm.

2. The glove with a sleeve according to claim 1, wherein a post-curing thermal deformation temperature of the moisture-curing urethane-based hot melt adhesive is no less than 80° C.

3. The glove with a sleeve according to claim 1, wherein the principal component of the sleeve is polyurethane, an ethylene-vinyl acetate copolymer, or polyvinyl chloride.

* * * * *